(12) United States Patent
Bäckestrand et al.

(10) Patent No.: US 7,451,112 B2
(45) Date of Patent: Nov. 11, 2008

(54) DYNAMIC INFORMATION DISSEMINATION WITHIN A TRADING SYSTEM

(75) Inventors: Michael Bäckestrand, Bromma (SE); Daniel Negishi, Stockholm (SE)

(73) Assignee: OMX Technology AB, Stockholm (SE)

( * ) Notice: Subject to any disclaimer, the term of this patent is extended or adjusted under 35 U.S.C. 154(b) by 975 days.

(21) Appl. No.: 10/444,076

(22) Filed: May 23, 2003

(65) Prior Publication Data

US 2004/0236663 A1    Nov. 25, 2004

(51) Int. Cl.
*G06Q 40/00* (2006.01)
(52) U.S. Cl. ........................................ 705/37
(58) Field of Classification Search .................. 705/1, 705/35, 37
See application file for complete search history.

(56) References Cited

U.S. PATENT DOCUMENTS 5,819,238 A   10/1998   Fernholz 6,304,858 B1   10/2001   Mosler et al.
2002/0004776 A1 *   1/2002   Gladstone .................... 705/37

OTHER PUBLICATIONS

Ivy Schmerken, Off Exchange Trading Chips Away at NYSE volume, Dec. 1992, Wall Street and Technology, vol. 10, 7 pages.*
Australian Examination and Search Report mailed Oct. 24, 2006 in corresponding Singapore Application No. 200507004-0.

* cited by examiner

*Primary Examiner*—James P. Trammell
*Assistant Examiner*—Brian Fertig
(74) *Attorney, Agent, or Firm*—Nixon & Vanderhye P.C.

(57) ABSTRACT

A method for use by an operator of a system for trading of financial instruments allows the operator to differentiate between the information a user of the system is given access to regarding trades which are made outside of the system and then reported to the system, so called off-exchange trades. The operator defines a first set of boundaries within which the off-exchange trades will be accepted by the system. The operator also defines which sub-sets of a set of information about the trade will be disseminated to users of the system. The definition of the boundaries and the sub-sets of information are defined independently of each other.

23 Claims, 4 Drawing Sheets

| Time | Series | Type | Cust A | Cust B | Price | Quantity | Interval (min) | Lowest Best Bid | Highest Best Ask | Outside spread |
|---|---|---|---|---|---|---|---|---|---|---|
| 10.22:30 | AAA500 | OS | ABC | CBA | 55,0 | 2000 | 5 | 57,0 | 62,0 | X |
| | ... | | | | | | | | | |
| 10.25:25 | BBB400 | OD | QWE | EWQ | 5,5 | 1000 | 5 | 4,5 | 6,5 | |

| Time | Series | Type | Cust A | Cust B | Price | Quantity | Interval (min) | Lowest Best Bid | Highest Best Ask | Outside spread |
|---|---|---|---|---|---|---|---|---|---|---|
| 10.22:30 | AAA500 | OS | ABC | CBA | 55,0 | 2000 | 5 | 57,0 | 62,0 | X |
| | ... | | | | | | | | | |
| 10.25:25 | BBB400 | OD | QWE | EWQ | 5,5 | 1000 | 5 | 4,5 | 6,5 | |

DYNAMIC INFORMATION DISSEMINATION WITHIN A TRADING SYSTEM

TECHNICAL FIELD

The present invention relates to a method for use by an operator of a system for trading of financial instruments. Using the innovative technology described below, reports to and from the system of trades that have taken place outside the system may be carried out with an improved degree of clarity to users of the system.

BACKGROUND

When trading with financial instruments, there is usually a difference between the buying price and the selling price, a difference referred to as the "spread". For example, if the buying price for a certain instrument is ninety and the selling price is ninety-three, the spread will be three. Normally, trades will be made at prices that are within the spread.

In a system for trading with financial instruments, a problem can arise if a trade is made within the spread, but outside the system, a so-called "off-exchange" trade. This can for example occur if two brokers agree on a trade within the spread, but then report the trade to the system at a point in time when the market has moved, which can happen if, for example, the buying or selling price has changed since the trade was agreed upon. In this case the reported trade can appear to have taken place outside the current spread, namely if the market movement was such that the current spread is outside the price of the reported trade. If this happens, the off-exchange trade will, for one thing, influence the statistics for that particular instrument in an undesired manner.

Within present systems for trading with financial instruments, the operator of the system can define whether or not trades which are made within the spread should be accepted by the system or not, and if they are accepted, whether or not the information relating to that trade should be disseminated to users of the system (e.g. brokers). An example of the problem that has been explained above could be that the present spread is at ninety to ninety-three, and an off-exchange trade at ninety-one is agreed upon between to brokers. The trade can be agreed upon before lunch, and then reported to the system after lunch. The market price for the same instrument after lunch may have moved so that the instrument is traded at a spread between ninety-three to ninety five. Thus, when a trade is reported at ninety-one, this report may influence the statistics in an undesired manner, which in the example, the report may wrongly influence the statistics downwards.

There is thus a need for a method for use in a system for trading of financial instruments where reports for off-exchange trades can be received by the system and communicated to users of the system, for example brokers, without negatively influencing the statistics in the system.

SUMMARY

A method for use by an operator of a system for trading of financial instruments allows the operator to choose which information a user of the system is given access to regarding trades which are made outside of the system. The operator defines so called off-exchange trades. The operator defines a first set of boundaries within which the off-exchange trades will be accepted by the system, and letting the operator define which sub-sets of a set of information about the trade that will be disseminated to users of the system. The definition of the boundaries and the sub-sets of information are defined independently of each other. Suitably, but not necessarily, off-exchange trades which have occurred within the first set of boundaries but outside of a second set of boundaries may be communicated to users of the system by indicating that the trade has occurred outside of the second set of boundaries and by communicating to users of the system the price and quantity of the trade.

DETAILED DESCRIPTION

Figure 1:
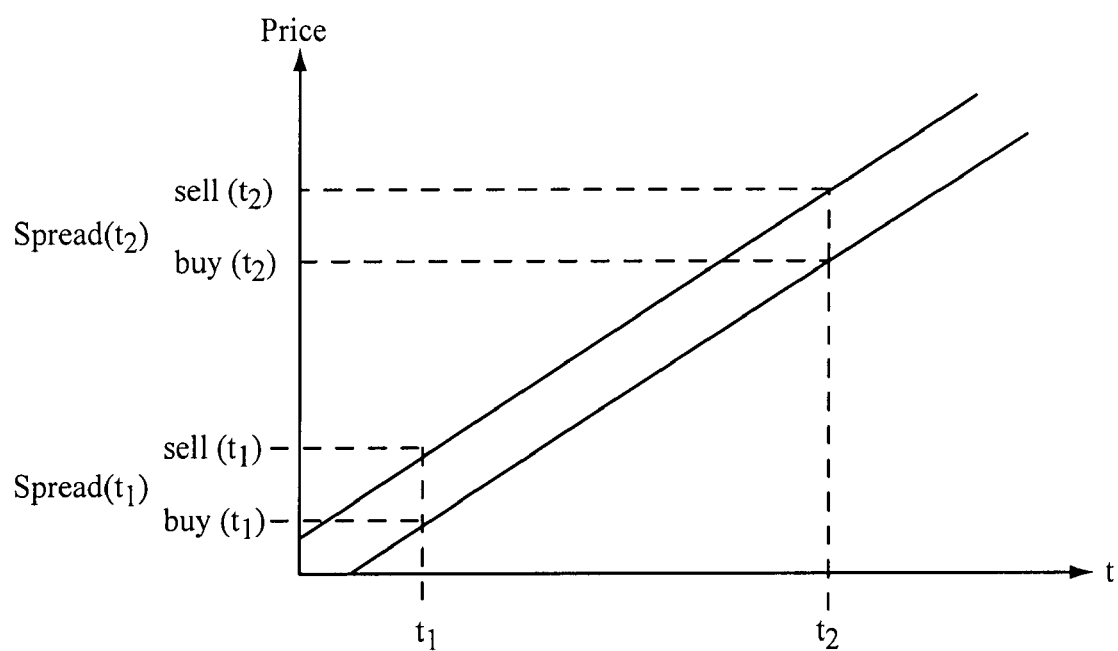
FIG. 1 shows a problem to be solved.

FIG. 1 schematically illustrates one of the problems that can be solved by using the technology described here. The graph for the "sell price" for a certain financial instrument is shown as a function of time. The term "financial instrument" in this context refers to such instruments as shares, options, etc. which will be realized by those skilled in the field.

At a first point in time, $t_1$, the sell price is at a certain level, with the buying price being lower, and with the price difference between buy and sell being referred to as the "spread." The spread at $t_1$ is indicated in FIG. 1 by means of a double arrow. All deals or trades which are carried out at a certain point in time will thus be with prices inside the spread for that point in time.

Consider the following situation. Trades are normally carried out within an automated system. But two brokers agree to a trade outside the situation, e.g., verbally or otherwise. This is permitted by the system and is referred to as an "off-exchange" deal. The deal is agreed upon at $t_1$, with the price agreed upon being well within the spread for $t_1$. However, the two brokers don't report their deal until a later point in time $t_2$. As indicated in FIG. 1, at $t_2$ the selling price for the financial instrument in question has gone up so much since the time when the deal was agreed upon that the deal is outside of the spread for $t_2$. If the system were to enter the deal into the statistics for the instrument in question and communicate it to the users of the system (brokers etc), the deal in question would appear to be an anomaly, and if the quantity traded is large enough, such a deal would likely influence the statistics for the instrument in question in an undesired manner. So the problem arises if an off-exchange trade has been made and is reported at a point in time when the price for that trade is outside the present spread.

The inventors recognized that a number of choices can be made by the operator of the system to handle situations involving off-exchange trades outside the present spread vis-à-vis the users of the system, primarily focused on which information will be communicated to the users regarding such trades. In addition, and preferably to be used in combination with the choices or settings made by the operator of the system, a number of choices and/or new sets of information may be communicated to, or handled by, the users of the system.

These choices and/or settings will be described in the following with reference to FIGS. 2-6, which are examples of menus presented to the operator (FIG. 2) and the users (FIGS. 3-6). However, it should be pointed out that the layout of these menus are merely examples, other layouts with the same and result may be used. In addition, it can also be pointed out that not all of the settings or choices in the menus need be present.

Figure 2:
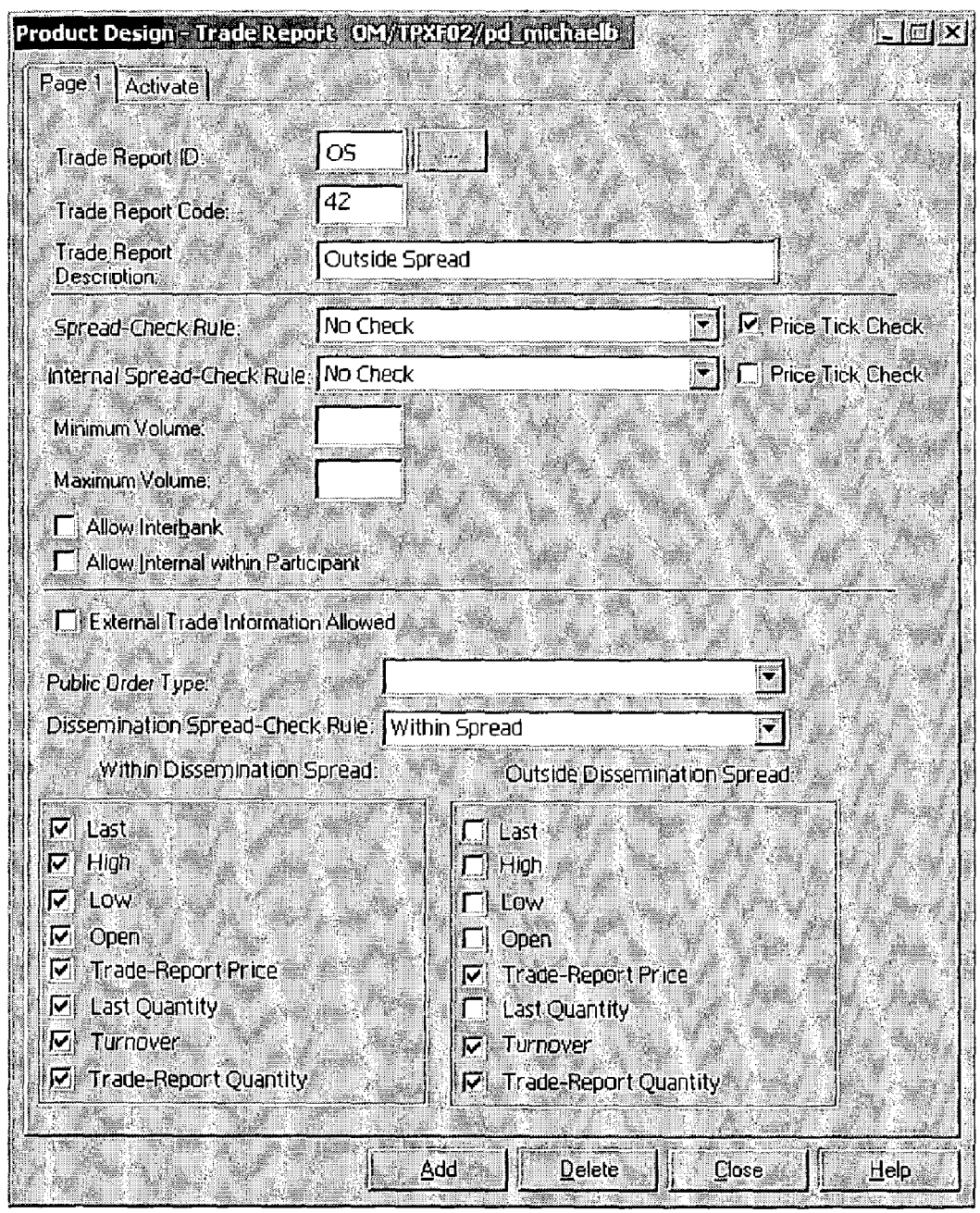
FIG. 2 shows examples of selections/settings for an operator of a system.

FIG. 2 shows a menu for use by an operator of the system, and comprises settings and choices to be made by the operator regarding off-exchange trades. One section of the menu involved the following matching rules, which will be applied to the trade report. Examples of spread check rules—the values which can be chosen are "within spread", "at spread", "no check", and "missing price OK". "At spread" means that if the spread is buy 100—sell 103, then trades for exactly those values are at spread, while "within spread" means trades in between those values. "Outside spread" is the situation described above, and in order to accept such trades the system should be configured with the rule "no check".

Internal spread check rule—same as spread check rule, but use if the report is registered internally by the exchange.

Price tick check—the system will check that the price reported is according to the applicable so called price tick tables, e.g. steps of 0.25. If the price tick check is not used, trades can be reported in other steps.

Minimum and maximum volume: the largest and/or smallest volumes that should be allowed as off-exchange trades.

Allow interbank: decides if off-exchange trades shall be allowed between different customers.

Allow internal within participant: decides if off-exchange trades shall be allowed within one customer.

If the trade does not meet the matching rules, the trade will not be executed by the system and an error message will be sent to the user who reported the trade.

In addition to the matching rules described above, choices are made available to the operator of the system regarding which information about trades that will be communicated to users of the system. Significantly, the matching rules and the communication rules which will be described below are independent of each other, i.e., any matching rule can be chosen in combination with any communication rule. Also, the exact rules shown can be varied or other rules added.

The information rules available to the operator of the system are the same as those listed above. An example that can be given is the spread check rule, which is the basic rule that governs the information. Examples of available values are "within spread" and "no check". If the rule that is chosen is satisfied by a trade, then a first sub-set of operator-defined information will be communicated to the users of the system, and if the rule is not satisfied by a trade, then another sub-set of operator-defined information will be communicated to the users of the system, as will be described in the following.

As can be seen in the menu in FIG. 2, and as has been mentioned previously, there is a possibility for the operator to define two different sub-sets of information for communication to the users of the system. One of the sub-sets will be communicated for trades that fulfil the "Dissemination" or "Information spread check rule", and the other will be communicated for trades that do not fulfill the "Dissemination" or "Information spread check rule".

Although, the information to chose from within the two sub-sets is identical, that is not necessary but is merely an example. Each piece of information in the sub-sets pertains to a particular commodity or instrument for the current trading cycle/day:

Last—last traded price
High—highest traded price
Low—lowest traded price
Open—opening price
Trade report price—a parameter that will be explained below.
Last quantity—quantity of the most recent trade
Turnover—the total trade volume so far during the day in question
Trade Report Quantity—a parameter that will be explained below.

The possibilities shown in FIG. 2 and described above are the possibilities open for an operator of the system, which define the information that will be communicated to the users of the system. The communication of that information to the users in a manner that will be described below. All the information communication described below will be subjected to the "Dissemination" or "Information spread check rule", as described earlier.

Figure 3:
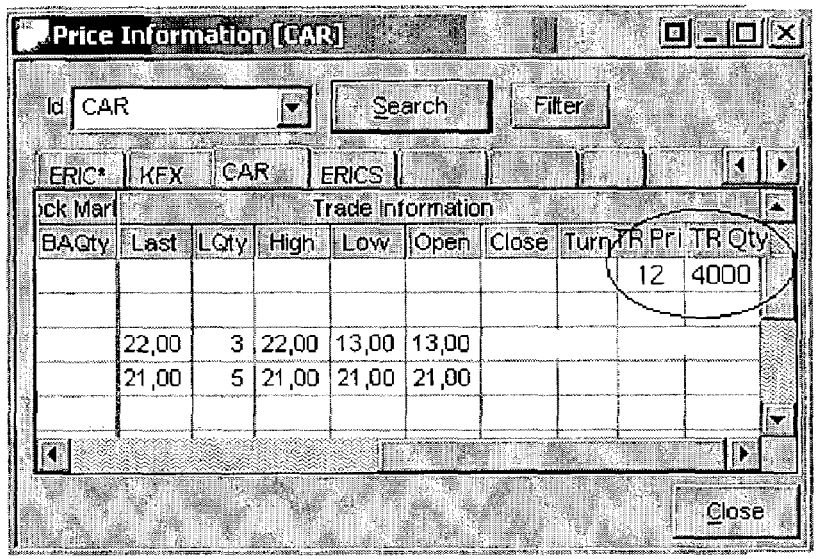
FIG. 3 shows price information to be displayed to a user of a system.

When communicating the latest deal in a certain commodity or paper to a user of the system, a menu similar to the one shown in FIG. 3 may be used. Each horizontal line contains information regarding the latest deal in a certain commodity or paper. If a trade outside the current spread were to be displayed to users, this might confuse the users or lead them to mistaken conclusions. In order to avoid this, but with a retained possibility to display such trades, a system does not show the same information as displayed for deals within the current spread. Thus, one way of indicating to the user that the trade has taken place outside the current spread is shown in FIG. 3: only the price and quantity will be communicated to the user (Trade report price and Trade report Quantity from FIG. 2), thus giving the user the information while at the same time still enabling him to identify the deal as an off-exchange trade which has taken place outside of the current spread.

Figure 4:
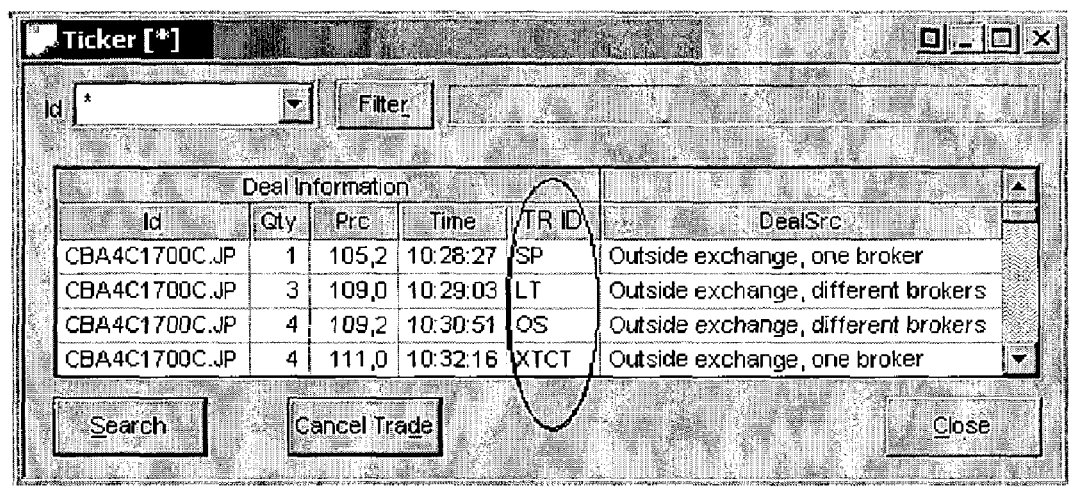
FIG. 4 shows how a so called "ticker" may be altered.

In addition to that which has been described above, the system may also allow the operator to define different types of off-exchange trades, the current type being communicated to a user of the system. One examples of how this might be embodied is shown in FIG. 4, which shows another user interface, a so-called "ticker". This means that each horizontal line in FIG. 4 shows a trade in one paper or commodity, with the lowest line showing information about the most recent trade. One column denoted as TR ID (trade ID), communicates the type of trade report to the user. The type of trade report can be defined by the operator of the system, which means that the types shown in the drawing are merely examples, with some of the types shown having the following meanings:

SP: Special
XTCT: crossing trade for combination

Figures 5, 6:
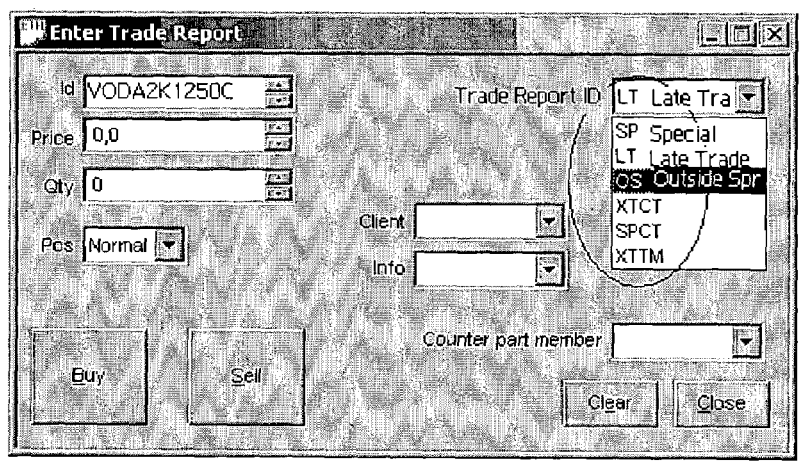
FIG. 5 shows how a trade report function may be designed.
FIG. 6 shows a batch report.

When a user of the system enters trade reports into the system, off-exchange trades outside the current spread are accommodated by the operator of the system define a number of different types of off-exchange trades and letting each instrument—commodity or paper—in the system be associated only with a sub-set of the number of different types of trades. An example of this is shown in FIG. 5: a menu for a user for entering trades into the system comprises the possibility of entering the ID of the commodity (VODA2K125OC), as well as the price and quantity. Also, a parameter called Trade Report ID is entered by the user that represents which kind of off-exchange trade this particular trade is.

There can be a link between each instrument type and the Trade Report ID so that not all kinds of trade reports can be performed with all kinds of instrument types. It is also possible to let the operator of the system define different limits for different users so that each user of the system may be associated only with an operator-defined sub-set of said number of different types of trades.

The invention claimed is:

1. A method for use in a computerized exchange system for matching of financial instruments that controls the information that users of the computerized exchange system are given access to regarding an off-exchange trade order match of a financial instrument made outside of the computerized exchange system at a first time and then reported to the computerized exchange system at a second later time, said method comprising:

defining a first set of boundaries within which the off-exchange trade order match will be accepted by the system, when a price of the off-exchange trade order match is outside of a price spread for the financial instrument in the computerized exchange system at the second later time, selecting a first sub-set of information about the off-exchange trade order match to be disseminated to users of the system that is different from a second sub-set of information about the off-exchange trade order match to be disseminated to the users when the off-exchange trade order match price is not outside of the price spread for the financial instrument in the computerized exchange system at the second later time.

2. The method of claim 1, wherein the first set of boundaries and the sub-sets of information are defined independently of each other, the method further comprising:

communicating one or more off-exchange trade order matches which have occurred within the first set of boundaries but outside of a second set of boundaries to users of the system by indicating that the trade order match has occurred outside of the second set of boundaries and by communicating to users of the system the price and quantity of the trade order match.

3. The method of claim 2, wherein which the first and second set of boundaries are the same.

4. The method of claim 2, wherein said communication to the users is carried out by only communicating to users of the system the price and quantity of the trade order match.

5. The method of claim 1, wherein the operator defines different types of off-exchange trade order matches and communicates to the users of the system which such type each off-exchange trade order match is.

6. The method of claim 5, wherein said information is communicated to the users of the system along with information about all trade order matches made in the system.

7. The method of claim 1, wherein the operator defines a number of different types of off-exchange trade order matches, with each financial instrument in the system being associated with an operator-defined sub-set of said number of different types of trade order matches.

8. The method of claim 7, wherein each user of the system is associated with an operator-defined sub-set of said number of different types of trade order matches.

9. A computerized exchange for matching financial instruments and for controlling the information users of the exchange are given access to regarding an off-exchange trade order match of a financial instrument made outside of the exchange at a first time and then reported to the exchange at a second later time, said system comprising:

first defining means for defining a first set of boundaries within which the off-exchange trade order match will be accepted by the exchange, means for determining when a price of the off-exchange trade order match is outside of a price spread for the financial instrument in the exchange at the second later time and selecting a first sub-set of information about the off-exchange trade order match to be disseminated to users of the exchange that is different from a second sub-set of information about the off-exchange trade order match to be disseminated to the users when the off-exchange trade order match price is not outside of a price spread for the financial instrument in the exchange at the second later time.

10. The exchange of claim 9, wherein the boundaries and the sub-sets of information are defined independently of each other, the exchange further comprising first communicating means for communicating to users of the system one or more off-exchange trade order matches which have occurred within the first set of boundaries but outside of a second set of boundaries, the first communicating means further being adapted to indicate to said users that the trade order match has occurred outside of the second set of boundaries and to communicate to users of the system the price and quantity of the trade order match.

11. The exchange of claim 10, wherein the first and second set of boundaries are the same.

12. The exchange of claim 10, wherein said first communicating means is adapted to only communicate to the users of the exchange the price and quantity of the trade order match.

13. The exchange of claim 10, further comprising:

second defining means for defining different types of off-exchange trade order matches, and second communicating means for communicating to the users of the exchange which the type of an off-exchange trade order matches.

14. The exchanger of claim 13, wherein said second communicating means is configured to communicate said information to the users of the exchange along with information about all trade order matches made in the exchange.

15. The exchange of claim 10, further comprising third defining means for enabling the operator of the system to define a number of different types of off-exchange trade order matches, and in which exchange each instrument in the exchange is associated with an operator-defined sub-set of said number of different types of trade order matches.

16. The exchange of claim 15, further comprising means for associating users of the exchange to be associated with said operator-defined sub-set of said number of different types of trades.

17. A method for use in a computerized trading exchange system for matching financial instruments, the method comprising:

enabling a first user of the trading exchange system to carry out an off-exchange trade order match of a financial instrument outside of the trading exchange system at a first time and then report said off-exchange trade order match to the trading exchange system at a second later time, when a price of the off-exchange trade order match is outside of a price spread for the financial instrument in the computerized exchange system at the second later time, enabling a second user to receive a first sub-set of information about said off-exchange trade order match which is disseminated by the trading exchange system to the second user, wherein the first sub-set of information is different from a second sub-set of information about the off-exchange trade order match that would be disseminated to the second user when the off-exchange trade order match price is not outside of the price spread for the financial instrument in the computerized exchange system at the second later time.

18. The method in claim 17, wherein for either of the first or second sub-sets of information to be disseminated to the second user, the off-exchange trade order match must be determined to be within a first set of boundaries, and wherein the first set of boundaries and the sub-sets of information are defined independently of each other.

19. A method for disseminating information in a computerized exchange system to users associated with the computerized exchange system regrading an off-exchange trade order match for a financial instrument at a match price that is made outside the computerized exchange system at a first time and then reported to the computerized exchange system at a second later time, the method comprising:

determining whether a reported off-exchange trade order match satisfies a predetermined condition for which the off-exchange trade order match will be accepted by the computerized exchange system, and if the off-exchange trade order match is accepted by the computerized exchange system, then disseminating a first sub-set of information about the off-exchange trade order match to the users when the off-exchange trade order match price is outside of a price spread for the financial instrument in the computerized exchange system at the second later time.

20. The method in claim 19, further comprising:

if the off-exchange trade order match is accepted by the computerized exchange system, then disseminating a second sub-set of information about the off-exchange trade order match, different from the first sub-set of information, to the users when the off-exchange trade order match price is at or within the price spread for the financial instrument spread in the computerized exchange system at the second later time.

21. The method in claim 19, wherein the predetermined condition and the sub-sets of information are defined independently.

22. Apparatus for disseminating information in a computerized exchange system to users associated with the computerized exchange system regarding an off-exchange trade order match for a financial instrument at a match price that is made outside the computerized exchange system at a first time and then reported to the computerized exchange system at a second later time, the apparatus comprising a computer configured to:

determine whether a reported off-exchange trade order match a predetermined condition for which the off-exchange trade order match will be accepted by the computerized exchange system, and if the off-exchange trade order match is accepted by the computerized exchange system, then disseminate a first sub-set of information about the off-exchange trade order match to the users when the off-exchange trade order match price is outside of a price spread for the financial instrument in the computerized exchange system at the second later time.

23. The apparatus in claim 22, further comprising:

if the off-exchange trade order match is accepted by the computerized exchange system, then the computer is configured to disseminate a second sub-set of information, different from the first sub-set of information about the off-exchange trade order match, to the users when the off-exchange trade order match price is at or within the price spread for the financial instrument spread in the computerized exchange system at the second later time.

* * * * *